United States Patent [19]

Ruckman

[11] Patent Number: 4,571,656

[45] Date of Patent: Feb. 18, 1986

[54] ELECTRICAL CIRCUIT FOR PROTECTION AGAINST SURGE OVERVOLTAGE OF TRANSIENTS

[75] Inventor: Stephen E. Ruckman, Capitola, Calif.

[73] Assignee: Dynatech Computer Power, Inc., Scotts Valley, Calif.

[21] Appl. No.: 570,703

[22] Filed: Jan. 13, 1984

[51] Int. Cl.[4] .............................................. H02H 9/04
[52] U.S. Cl. ........................................ 361/56; 361/91; 361/111; 361/119
[58] Field of Search .................... 361/56, 91, 110, 111, 361/89, 118, 119, 120

[56] References Cited

U.S. PATENT DOCUMENTS

| | | | |
|---|---|---|---|
| 3,300,710 | 1/1967 | Knauss | 361/56 X |
| 3,372,285 | 3/1968 | Blazek et al. | 361/56 X |
| 3,546,572 | 12/1970 | Specht et al. | 361/111 |
| 3,660,719 | 5/1972 | Grenier | 361/56 |
| 3,890,543 | 6/1975 | Jonassen | 361/56 |
| 4,023,071 | 5/1977 | Fussell | 361/56 |
| 4,068,279 | 1/1978 | Byrnes | 361/111 X |
| 4,217,618 | 8/1980 | Kellenbenz et al. | 361/56 |

FOREIGN PATENT DOCUMENTS

| | | | |
|---|---|---|---|
| 1538324 | 11/1969 | Fed. Rep. of Germany | 361/56 |
| 64973 | 2/1949 | Netherlands | 361/56 |

Primary Examiner—Patrick R. Salce
Attorney, Agent, or Firm—Townsend and Townsend

[57] ABSTRACT

A circuit containing a pair of spaced leads and first, second and third current paths across the leads. The first path defines a first stage containing a first zener diode in series with a first resistor. A second zener diode can be placed in parallel across the first resistor to prevent excessive buildup of voltage across the first resistor. The second path defines a second stage containing a varistor which acts to relieve the first stage with a higher power dissipation but at a slower reaction time. The third path defines a third stage containing a gas discharge tube in series with a second resistor. A varistor is in parallel with the second resistor of the third stage to limit the voltage across the second resistor due to impulse current. The circuit combine the zener diodes, the varistor and the gas discharge tube in a manner to ensure rapid response and high energy dissipation to incoming transient impulses. The circuit has a high impedance under non-transient conditions so that, under normal operation, no load current passes through the first, second and third stages.

5 Claims, 1 Drawing Figure

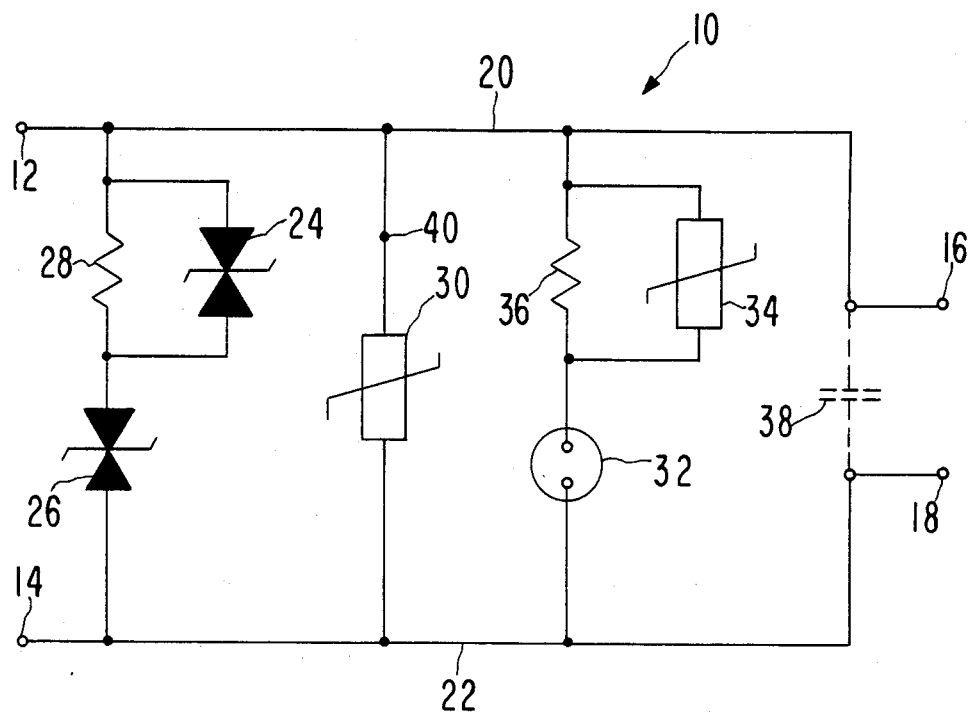

ELECTRICAL CIRCUIT FOR PROTECTION AGAINST SURGE OVERVOLTAGE OF TRANSIENTS

BACKGROUND OF THE INVENTION

1. Field of the Invention

This invention relates to improvements in techniques for protecting circuits against the damaging effects of electrical transients and, more particularly, to an electrical circuit for overvoltage protection.

2. Description of the Prior Art

Many types of electrical equipment are susceptible to damage due to transient impulses which exceed a certain maximum voltage. Computers, for instance, are extremely sensitive to such voltage transients. Since voltage transients are caused by such things as lightning strikes, inductive load switching and physical shock to power lines, utility companies which supply electrical power have no practical ways of preventing such occurrences.

Attempts have been made in the past to provide against transient impulse surges over voltage and, for the most part, these attempts have not been completely satisfactory for one or more reasons. Thus, a need has continued to exist for improvements in protection circuits to guard against damage due to over-voltage of transient impulses and the present invention satisfies the aforesaid need in a manner as hereinafter described.

SUMMARY OF THE PRESENT INVENTION

The circuit of the present invention is a hybrid type of protection circuit. It takes advantage of the best qualities of three types of transient protection components, namely the zener diode, the varistor and the spark gap. Technology has improved these devices to make them more efficient as transient over voltage protectors. Generally, the zener diode is now in the form of a transient absorption zener (TAZ) or silicon avalanche diode or transorb. The varistor (voltage dependent resistor) has been improved as a metal oxide varistor (MOV). The spark gap has been improved and now appears in the form of a gas discharge tube (GDT).

The ideal transient protector has both rapid response time and high power dissipation. Neither of these features is achievable in any one type of surge protection component of the type listed above. The transient absorption zener has rapid response time (ps to low ns) but low energy absorption (a few joules), 1.5 joules being typical for a single unit (compared with a similar size and cost for the MOV and GDT).

The metal oxide varistor has medium response time and energy dissipation compared with a similar size and cost for the TAZ and GDT (high ns to low μs) at about 50 joules being typical. The gas discharge tube has the slowest response time (μs) and the highest energy absorption (typically 100 joules and up) for a similar size and cost for the TAZ and MOV.

The circuit of the present invention takes advantage of the best qualities of each of the three components mentioned above and provides a means of combining such components so that they operate together to ensure rapid response and high energy dissipation to incoming transient impulses. The circuit of the present invention also features parallel or shunt operation. The circuit is connected in parallel to the line to be protected so that under normal conditions, no load current passes through the circuit or any of its components due to its very high impedance under non-transient conditions.

The primary object of the present invention is to provide an improved circuit for protection against transient impulse surge overvoltages wherein the circuit includes three types of protection devices, namely a varistor, a zener diode and a gas discharge tube in a manner to ensure rapid response time and high energy dissipation to incoming transient pulses while no load current passes through the circuit under non-transient conditions.

Other objects of the present invention will become apparent as the following specification progresses, reference being had to the single schematic diagram illustrating specific details of the present invention.

DETAILED DESCRIPTION OF THE PREFERRED EMBODIMENT

The electrical circuit of the present invention is broadly denoted by the numeral 10 and is suitable for use in protection against transient impulse surge overvoltages from AC lines or DC lines. The circuit has input terminals 12 and 14 and output terminals 16 and 18. In the alternative, terminals 16 and 18 can be the input terminals, and terminals 12 and 14 can be the output terminals.

Terminals 12 and 16 are coupled to a first lead 20, and terminals 14 and 18 are coupled to a second lead 22. Circuit 10 further includes a first stage which includes a pair of zener diodes 24 and 26 in series with each other and across leads 20 and 22. A resistor 28 is in parallel with diode 24 and in series with diode 26.

A second stage of circuit 10 includes a varistor 30 which is coupled at its ends to leads 20 and 22. Varistor 30 is a voltage dependent resistor, typically a metal oxide varistor (MOV).

A third stage of circuit 10 includes means defining a spark gap including a gas discharge tube 32 in series with a second varistor 34 with the gas discharge tube and the varistor being coupled to leads 20 and 22 as shown in the FIGURE. A second resistor 36 is in parallel with varistor 34 and in series with the gas discharge tube 32. A capacitor 38 can be coupled across leads 20 and 22 to condition transient wave fronts or to add EMI-RFI filtering to circuit 10.

For AC operation, zener diodes 24 and 26 are typically back-to-back zener diodes; however, for DC operation, a single diode may be used, namely diode 26 in series with resistance 28. As an optional feature, at location 40 in stage 2, a varistor in parallel with a resistor can be placed at this location. Such varistor-resistor combination would be the same as the combination of varistor 34 and resistor 36.

Stage 3 typically is omitted in circuits of relatively low power where "holdover" is not a problem. Also, the order of the stages in the operation of circuit 10 is not important. The circuit can be turned upside down and work just as effectively.

Circuit 10 operates as follows:

It is assumed, for purpose of illustration, that an AC voltage of a 120 volts rms is impressed on terminals 12 and 14. The peak voltage would then be 170 volts. Circuit 10 would be used then to protect against transient impulse surge overvoltages.

The first stage features fast response time because of the rapid clamping action of diodes 24 and 26. Under low energy transient conditions, diode 26 limits the transient to almost its clamping level, for example, 200 volts peak. There will be a slight voltage drop across resistor 28 because of the current through diode 26. Thus, the voltage at points A and B across stage 1 of circuit 10 will be the sum of the voltages across resistor 28 and diode 26. The value of resistor 28 is selected such that, as the upper limit of the safe power dissipation range of diode 26 is approached, the voltage at point A is high enough to fire varistor 30 of stage 2 which operates at higher power, but is slower to operate. Varistor 30 now acts to relieve the components of stage 1 with its higher power dissipation.

If the incoming transient pulse is of higher power and is very fast, i.e., it has a rapidly rising wave front, the voltage at point A can become excessive, such voltage being the sum of the voltages across resistor 28 and diode 26. To prevent this excessive buildup of voltage, diode 24 is placed in parallel with resistor 28. The clamping value of diode 24 is selected such that the sum of the voltages across diodes 24 and 26 is slightly greater than the voltage across varistor 30 to give the slower varistor time to respond yet keeping the voltage at point A as low as possible with respect to the clamping values which have been selected for diodes 24 and 26. Stage 2, therefor, relieves stage 1 with its high power dissipation.

For transient impulses of higher power and longer duration, gas discharge tube 32 of stage 3 will actuate and relieve both the stages 1 and 2 by crowbarring of leads 20 and 22 across resistor 36. If the voltage across resistor 36 becomes excessive due to impulse current, varistor 34 limits this voltage to a reasonable level with respect to the overall suppression level desired, and the clamping value of varistor 34 is chosen to have this effect. In this particular example, varistor 34 may be selected to clamp the voltage across resistor 36 at 200 volts peak. Resistor 28 is used in higher power operation to protect the gas discharged tube from "holdover", that is, line current after the passing of impulse current which can destroy the gas discharge too. If resistor 36 is omitted, then, of course, varistor 34 is omitted.

I claim:

1. An electrical circuit for surge overvoltage protection comprising:
    means defining a pair of spaced leads, first ends of the leads defining signal input terminals and the second ends of the leads defining signal output terminals;
    a first stage across the leads and directly connected to said input and output terminals, the first stage including a first resistor and a first zener diode in series with each other, there being a second zener diode in parallel with the first resistor;
    a second stage across the leads and directly connected to said input and output terminals in parallel with the first stage, the second stage including a varistor coupled to said leads; and
    a third stage across the leads and directly connected to said input and output terminals in parallel with the first and second stages, the third stage including a gas discharge tube and a second resistor in series with each other, there being a second varistor in parallel with the resistor of the third stage.

2. A circuit as set forth in claim 1, wherein the second stage includes a third resistor in series with the varistor and a zener diode in parallel with the third resistor.

3. An electrical circuit for surge over voltage protection comprising:
    means defining a pair of spaced leads, first ends of the leads defining signal input terminals and the second ends of the leads defining a signal output;
    a first stage across the leads and directly connected to said input terminals, the first stage including a resistor and a first zener diode in series with each other, there being a second zener diode coupled in parallel with the resistor of the first stage; and
    a second stage across the leads in parallel with the first stage, the second stage including a varistor coupled to said leads and directly connected to said input terminals.

4. An electrical circuit for surge over voltage protection comprising:
    means defining a pair of spaced leads, first ends of the leads defining signal input terminals and the second ends of the leads defining a signal output;
    a first stage across the leads and directly connected to said input terminals, the first stage including a resistor and a zener diode in series with each other;
    a second stage across the leads in parallel with the first stage, the second stage including a first varistor coupled to said leads and directly connected to said input terminals; and
    a third stage across the leads and directly connected to said input terminals in parallel with the first and second stages, the third stage including a gas discharge tube and a resistor in series with each other, there being a second varistor in parallel with the resistor of the third stage.

5. An electrical circuit for surge over voltage protection comprising:
    means defining a pair of spaced leads, first ends of the leads defining signal input terminals and the second ends of the leads defining a signal output;
    a first stage across the leads and directly connected to said input terminals, the first stage including a resistor and a zener diode in series with each other; and
    a second stage across the leads in parallel with the first stage, the second stage including a varistor coupled to said leads and directly connected to said input terminals, a resistor in series with the varistor, and a zener diode in parallel with the resistor in the second stage.

* * * * *